United States Patent [19]

Giordano et al.

[11]  4,394,858

[45]  Jul. 26, 1983

[54] PHOTOCHEMICAL CONVERSION AND STORAGE OF LIGHT ENERGY BY ENDOERGIC ISOMERIZATIONS

[75] Inventors: Paul J. Giordano, Hudson; Richard C. Smierciak, Warrensville, both of Ohio

[73] Assignee: Standard Oil Company, Cleveland, Ohio

[21] Appl. No.: 221,589

[22] Filed: Dec. 31, 1980

[51] Int. Cl.$^3$ .............................. F24H 7/00; F24J 3/02
[52] U.S. Cl. .................................... 126/400; 126/430; 204/158 R
[58] Field of Search ....................... 204/158 R, 162 R; 126/424, 400, 430; 432/1, 29; 165/2

[56] References Cited

U.S. PATENT DOCUMENTS

| | | | |
|---|---|---|---|
| 3,350,291 | 10/1967 | Srinivasan | 204/162 R |
| 3,497,435 | 2/1970 | Wismer et al. | 204/158 R |
| 3,994,675 | 11/1976 | Sasse et al. | 204/158 R |
| 4,004,571 | 1/1977 | Schwerzel et al. | 204/158 R |
| 4,004,572 | 1/1977 | Nathan et al. | 204/158 R |
| 4,004,573 | 1/1977 | Frieling et al. | 126/400 |
| 4,123,219 | 10/1978 | Sasse et al. | 432/1 |
| 4,169,030 | 9/1979 | Gray et al. | 204/157.1 R |
| 4,225,735 | 9/1980 | Hall et al. | 585/360 |

*Primary Examiner*—Howard S. Williams
*Attorney, Agent, or Firm*—Joseph G. Curatolo; Herbert D. Knudsen; Larry W. Evans

[57] ABSTRACT

A process is provided for the capture and storage of radiant energy in highly strained carbon containing ring structures of isomerizable compounds. The process includes exposing a photocatalyst containing a compound of a metal selected from Re, Ir, Rh, Ru, Os, Pt, Pd and mixtures thereof, to radiant energy in the presence of an isomerizable compound capable of forming strained intramolecular ring structures.

10 Claims, No Drawings

PHOTOCHEMICAL CONVERSION AND STORAGE OF LIGHT ENERGY BY ENDOERGIC ISOMERIZATIONS

BACKGROUND OF THE INVENTION

This invention relates to a process for the photochemical conversion of light energy and storage thereof in chemical isomerizations. More particularly, it relates to the capture and catalytic conversion of photon light energy to effect reversible chemical isomerizations, and the storage of the light energy as potential energy in chemical bond strain resulting from the isomerizations. The energy thus stored is released, generally as heat upon subsequent reverse isomerization.

The storage of solar, or light energy has been accomplished in the past by permitting the impingement of photons of light upon a surface, generally a black surface. Light energy is absorbed and converted to thermal energy which is transferred to a material having thermal energy storage capacities, such as rocks or water. The thermal energy storage capacities of these materials are low, however on the order of about 50 to about 200 joules per gram.

It has been proposed that solar energy storage could be accomplished by utilizing photon or light energy to drive reversible chemical reactions in which the product or products of the light-driven reaction have a greater potential energy than the products of the reverse reaction, which potential energy may be released during the reverse reaction in the form of heat. Until the reverse reaction was initiated, however, the potential energy derived from the light energy could be stored with minimal dissipation. Among the suitable types of photochemical reactions for this purpose is the photoisomerization reaction in which the product of the light-driven reaction stores the light energy captured in the form of the potential energy of highly strained chemical bonds, such as in carbon containing ring systems.

U.S. Pat. Nos. 3,994,675 and 4,123,219 disclose the storage of light energy in the light-driven photoisomerization of substituted naphthalenes and in the light driven dimerization of substituted naphthalenes. The thermal energy storage capacities of the reactions exemplified are on the order of 50–120 calories/g (200–500 joules/g). The reactions exemplified were inhibited, however, by oxygen, particularly the photoisomerization reaction.

U.S. Pat. Nos. 4,004,571; 4,004,572 and 4,004,573 disclose the solar energy induced isomerization of organic isomerizable compounds to a high energy intramolecular strained ring structure. It is stated that such isomerizations may be aided by photosensitizers which absorb light in the visible wavelengths and then transfer energy to the isomerizable compound to induce the isomerization reaction to occur. The high energy isomer stores the solar energy in the strained ring structure until induced by heat or catalysis to revert to its lower energy isomeric form. The stored energy is released during the reverse isomerization in the form of heat. Various suitable isomerizable compounds and energy release (reverse isomerization) catalysts are listed in these patents, the disclosure of which is hereby incorporated by reference, as if written out in full, in the application.

U.S. Pat. No. 3,497,435 discloses the photoisomerization of cis, cis-dimethylmuconic acid using photosensitizers selected from aromatic hydrocarbons or ketones having triplet state excitation energy of above 55 kcal/mole and an oxygenated organic solvent containing water.

U.S. Pat. No. 3,350,291 discloses a method of preparing strained polycyclic hydrocarbons by the photoisomerization of cyclic olefins in the presence of a photosensitizer such as acetone, acetophenone or benzophenone as was known, or in the presence of a cuprous salt such as cuprous halide, nitrate or sulfate, Exemplified is the isomerization of bicyclo (2.2.1) hepta-2,5 -diene (2,5-norbornabiene) to quadricyclane in the presence of a cuprous chloride "pi" complex of 1,5-cyclooctadiene.

Although the photoisomerization of carbon-containing ring systems for the storage of solar energy in the resulting strained bonds is attractive, such as the photoizomerization of norbornadiene to quadricyclane, the reaction systems and photosensitizers previously investigated are not suitable for solar energy storage systems.

The photoisomerization of the naphthalenes, discussed above, is inhibited by oxygen, thus requiring any solar energy storage system which utilized the reaction to be completely air tight at all times.

Some organic photosensitizer compounds, such as acetophenone, do not strongly absorb light of the solar spectrum. Acetophenone, for example, absorbs light having a wavelength of 254 nm. The solar spectrum as received at the surface of the earth, however, contains only wavelengths of radiation greater than 292 nm, due to the screening effects of the atmosphere. The cuprous salt and cuprous salt complex type photosensitizing catalysts also absorb strongly in the ultraviolet region at about 254 nm, but these also absorb light weakly up to about 320 nm.

Energy transfer which is achieved with photosensitizers or photocatlysts is accomplished through the lowest excited electronic states, which states are phosphorescent in character. In organic photosensitizers, there is poor communication between the singlet manifold which absorbs energy and the triplet manifold which transfers energy. With organic photosensiters, only a small percentage of photons which are absorbed may effect the triplet state. Metal containing compounds such as organometallic complexes possess spin orbit coupling, such that a much larger percentage of photons absorbed effect excitation to the triplet state.

The cuprous salt photocatalyst system, however, is also air sensitive. Only the Cu(I) species in luminescent, that is, capable of electron excitation in response to photon "capture" and subsequent release or transfer (quenching) of the energy thus captured or absorbed. The Cu(II) species does not exhibit this phenomenon for the photoisomerization reactions discussed above. Because Cu(I) is highly susceptible to oxidation to Cu(II), the presence of air in the photoisomerizable compound/photocatalyst system is highly deleterious to the reaction desired due to resulting catalyst inactivation.

It is therefore an object of the invention to provide a process for the capture, storage and release of solar energy in the photoisomerization of carbon-containing ring systems capable of forming high energy intramolecular strained ring structures.

It is a further object of the invention to provide a process for the capture, storage, and release of solar energy utilizing photoisomerization catalysts capable of capturing solar energy and transferring the energy to a photoisomerizable compound, which catalysts are stable against thermal and oxidative deterioration.

SUMMARY OF THE INVENTION

The basis of all photochemical reactions is that activation of a molecule is provided by absorption of a photon of light to produce an electronically excited state, separated from the ground state by discrete energy levels. Only light absorbed by a system is effective in producing a photochemical change, and each photon or quantum of light absorbed or "captured" activates one molecule in the primary excitation step of a photochemical sequence. Each photon or quantum absorbed by a molecule has a certain probability of activating an electron to either the lowest excited singlet state, or the lowest excited triplet state, which states are required to initiate essentially all photochemical processes.

The energy difference between the excited state of a molecule and the ground state of the molecule, on a mole basis, is the activation energy for that molecule, measured in kilocalories per mole. The activation energy may be referred to as the triplet energy.

This activation energy or triplet energy may be released by several processes. The molecule may relax to the ground state after activation by releasing energy by the emission of light. More importantly, the activated molecule may release the energy of activation by transferring the energy to another molecule, thereby raising the energy level of the second molecule to an excited state and being "quenched" by it.

The quenching molecule may itself release the activation energy, or the activation energy may overcome an energy barrier in the molecule to allow a chemical or structural transformation to occur. An example of this would be the isomerization of a molecule to a higher energy or a less sterically favored conformation. If the high energy conformation is stable, the energy of activation, or some increment of that energy, is stored in the molecule by virtue of the potential energy represented by the high energy conformation.

The organic compounds to which this invention is applicable have significant storage enthalpies, due to the creation of bond angle strain in small, intramolecular, carbon containing rings or due to the loss of resonance in pi bonding systems. The photoisomerized product is thermodynamically unstable, but orbital topology constraints or symmetry restraints confer kinetic stability which inhibits the reverse reaction so that the energy represented by the potential energy difference between the isomers can be stored. This energy is releasable upon the reverse isomerization of the molecule to a more sterically favored conformation after overcoming the kinetic stability either thermally or catalytically.

In order to drive the photoisomerization reaction, according to classical excited state electronic energy transfer theory, the photocatalyst should have an activation energy, or lowest excited state (triplet) energy that is greater than the energy required to excite the quencher molecule to the state required for the isomerization to occur.

We have found, however, that a class of photocatalysts are capable of driving photoisomerization reactions in isomerizable carbon containing compounds which have an activation energy for isomerization higher than the triplet energy of the photocatalyst. These photocatalysts should not, according to classical excited state electronic energy transfer theory, be able to transfer sufficient energy to the isomerizable compounds to permit the isomerization to occur. It is unexpected that the triplet energy of the photocatalyst is quenched by the isomerizable compounds having an isomerization activation energy equal to or greater than the triplet energy of the photocatalyst, and the mechanism by which these photocatalysts function is not known.

In general, the process of the present invention includes the capture and storage of solar energy by exposing a photocatalyst to light in the presence of a reversibly isomerizable carbon containing compound.

DETAILED DESCRIPTION OF THE INVENTION

Photoisomerizable compounds suitable for use in the process of the present invention are those which can quench the triplet energy state of photosensitizers to effect a reversible intramolecular isomerization to a high energy conformation. The compounds are carbon containing and preferably include in their molecular structure at least two reactive carbon to carbon double bonds. Using the preferred compounds, the photocatalyst quenching reaction is accompanied by an intramolecular cyclization of the isomerizable compound to form a strained ring structure in which the potential energy is stored. Suitable isomerizable compounds are described in U.S. Pat. Nos. 4,004,571; 4,004,572 and 4,004,573.

Preferred isomerizable compounds include bicyclo (2.2.1) hepta-2,5-diene (norbornadiene) and substituted norbornadienes. The substituted norbornadienes preferably are functionalized in the 2, 3, 5 or 6 positions. Substituents may include any functionalities which do not interfere with the isomerization reaction. Preferred substituents include carboxylic acid groups and ester groups having up to about 3 carbon atoms each.

Preferred isomerizable compounds have a high energy density or heat storage capacity, measured as the amount of energy capable of being stored per gram of compound.

Norbornadiene, when photoisomerized to yield quadricyclane, exhibits an energy density of approximatey 287 calories per gram, or about 1200 joules per gram. The heat storage capacity of water, to contrast a passive solar energy storage system, is only about 200 joules per gram. Even though quadricyclane contains strained carbon ring structures, it is stable up to about 150° C. and will not appreciably isomerize to norbornadiene below that temperature, unless in the presence of a reverse isomerization catalyst.

Photocatalysts according to the present invention include metal compound photosensitizers, preferably complexed with organic ligands. Suitable metal components include compounds containing rhenium, iridium, rhodium, ruthenium, osmium, platinum and palladium. Preferred are rhenium, iridium and rhodium. Most preferred is rhenium. The metal may be present as a salt such as halides or acetates or present in other compounds such as carbonyls or alkyls such as methyl.

The complexing ligand may be an organic molecule which is capable of accepting a redistribution of electron density from the metal upon the absorbance of light photons by the photocatalyst. Such redistribution enhances the ability of the photocatalyst to transfer charge or energy to the isomerizable compound. Suitable ligands include olefinic compounds, aromatic compounds, and aromatic heterocyclic compounds containing oxygen or nitrogen atoms in the hetero ring. The above ligand compounds may be substituted or unsubstituted. Preferred are aromatic heterocyclic compounds containing a nitrogen atom in the ring structure. These include but are not limited to pyridine, bipyridine, ethylpyridine, benzoylpyridine, phenylpyridine and quinoline. The mole ratio of ligand to metal depends upon the metal and ligand selected, but generally is about 0.5:1 to 10:1, and preferably about 2–3:1.

The photocatalyst may be contacted with the isomerizable compound in the presence of solvents, such as benzene, ethanol and the like. Polar solvents are preferred.

The photocatalysts of the present invention are both thermally and oxidatively stable. Whereas copper containing photocatalysts described above are deactivated through oxidation when air or oxygen is admitted to the catalyst/isomerizable compound system, the photocatalysts of the present invention are not readily air-oxidizable, and can tolerate air in the system. To the extent that oxygen acts as a quencher of photocatalysts in general, that is, a portion of the absorbed light energy may be transferred to oxygen, and this reaction competes with the isomerization reaction, it is preferred that the amount of oxygen in the system be minimized. It should be noted, however, that the presence of oxygen in the process of the present invention does not destroy the catalyst or the reaction.

The photocatalysts of the present invention absorb light of the solar spectrum up to wavelengths of about 400 nm, and absorb the light of the solar spectrum from 292 nm to 320 nm more strongly than the prior art photocatalysts discussed above. In addition, the intensity or amount of solar radiation having wavelengths greater than 320 nm is greater than the intensity of solar radiation having wavelengths less than 320 nm. For example, the solar intensity at 400 nm is about twice as great as at 320 nm. The photocatalysts of the present invention are able to absorb a far greater amount of the solar spectrum and total solar radiation, compared to the above described catalysts.

According to the process of the present invention, the photocatalyst is contacted with the photoisomerizable compound and exposed to light. Light photons are absorbed or captured by the photocatalyst and cause electron excitation in the catalyst. The light energy absorbed is available in the amount of the photocatalysts' triplet energy, for transfer to the photoisomerizable compound. The photoisomerizable compound quenches the photocatalyst, and the triplet energy when transferred, provides the energy of activation for the isomerization reaction to occur. The photoisomerized compound stores at least a portion of the solar energy initially absorbed by the photocatalyst, in the strained conformation.

The energy thus stored may be released in the form of heat by inducing the photoisomerized compound to return to the lower energy conformation. The reverse isomerization may be induced by heat or by catalysis. Suitable catalysts include those having acidic properties, such as the reverse isomerization catalysts listed in U.S. Pat. No. 4,004,572.

It has previously been demonstrated that the triplet energy of chloro rhenium tricarbonyl bis-4-phenylpyridine may be quenched by trans-stilbene and cis-stilbene. Photo-isomerization occurs to yield a mixture of both the trans and cis isomers of stilbene. This is thought to be due to the activation energies (excited state) of trans stilbene (about 50 Kcal/mole) and cis-stilbene (about 57 Kcal/mole) both being less than the triplet energy of the rhenium (I) photocatalyst, (about 62 Kcal/mole). Naphthalene (activation energy about 61 Kcal/mole) has been shown to quench the triplet energy of ClRe(CO)$_3$(4-phenylpyridine)$_2$, but the rate constant of the quenching is significantly reduced, due to the minor difference between the triplet energy of the photocatalyst and the excited state or activation energy of naphthalene.

We have found, however, that the triplet energy of the Re(I) photocatalyst is unexpectedly quenched by 2,5-norbornadiene, which has an activation energy of about 70 Kcal/mole. The quenching of the photocatalyst triplet energy is accompanied by the isomerization of norbornadiene to quadricyclane, depicted below.

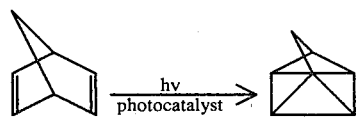

According to excited state electronic energy transfer theory, the Re(I) photocatalyst should not be able to drive the isomerization of norbornadiene to quadricyclane, because the triplet energy of 62 Kcal/mole is less than the activation energy of 2,5-norbornadiene, 70 Kcal/mole. The mechanism by which the Re(I) photocatalyst drives the isomerization is not known.

Included below are additional photoisomerizable compounds whose isomerizations may be driven by the Re(I) photocatalyst and other photocatalysts according to the process of the invention.

| ISOMERIZABLE COMPOUND | ENERGY STORAGE CAPACITY (joules/gram) |
|---|---|
|  | 500 |
|  | 1360 |
|  | 1570 |
|  | 272 |

EMBODIMENTS OF THE INVENTION

Although solar radiation (comprising ultraviolet, visible and infrared radiation) is the preferred light source for the photoisomerization reaction, any light source which emits wavelengths of light absorbed by the photocatalysts may be used to supply the light energy.

For the experiments described below, the light source used was a 200-watt, short-arc, super-pressure, mercury lamp having a quartz envelope, (Bausch & Lomb) and was used in conjunction with a quartz collective lens. The lamp produces light of continuous, fairly uniform intensity covering the spectrum of UV, visible, and infrared. There are several very high intensity discrete spectral bands, due to the nature of the mercury arc spectrum. Those of major importance occur at 254, 313, 366, 405, 436, 550, and 580 nm. On the other hand, this type of light source is deficient in light energy in the high wavelength side from about 254–275 nm. The arc has an average luminance of 25,000 candles per square centimeter and a luminous efficiency of 47.5 lumens per watt at a real power of 200 watts. The reaction vessel used was a quartz tube 200×32 mm with a volumn of about 130 ml. An auxiliary light source, a broad band ultraviolet light, was also used. Products were analyzed using a Carle III analytical gas chromatograph using thermistors as detectors.

EXAMPLE 1

The photocatalyst chloro rhenium tricarbonyl bis-4 phenylpyridine was prepared by the following procedure. To 800 ml of rapidly mixing hot iso-octane was added 1.5 g ($4.1 \times 10^{-3}$ moles) rhenium pentacarbonyl chloride. To this was added 50 ml of an iso-octane solution containing 1.5 g ($9.7 \times 10^{-3}$ moles) 4-phenylpyridine (an 18% molar excess). A white precipitate formed and was filtered using a fritted glass funnel. This precipitate was dried using suction for about 1 hour. The infrared spectrum of the Re(I) compound shows three peaks due to carbonyl stretching at 2020 cm$^{-1}$, 1920 cm$^{-1}$, and 1890 cm$^{-1}$. The ultraviolet-visible spectrum of the Re(I) compound gives the following extinction coefficients: $\Sigma 300$ (shoulder)=32,000 and $\Sigma 270$=44,000.

A solution was prepared containing 50 g (0.54 moles) 2,5 norbornadiene in 70 ml benzene and this solution was deaerated with $N_2$ for several minutes. To this solution was added 0.3 g ($4.9 \times 10^{-4}$ moles) of chloro rhenium tricarbonyl-bis-4 phenylpyridine and 0.6 g ($3.9 \times 10^{-3}$ moles) of excess 4-phenylipyridine. Deaerating was continuous and the solution was irradiated in a quartz tube with the 200 watt, super high pressure mercury arc lamp. The rapid formation of quadricyclane was reported by gas chromatographic analysis almost immediately. After 24 hours of irradiating, analysis indicated the formation of a large amount of quadricyclane about 25 gms (0.27 moles).

EXAMPLE 2

A solution was prepared containing 9.2 g norbornadiene in 100 ml absolute ethanol and was deaerated with $N_2$ for several minutes. To the solution was added 0.62 g chloro rhenium tricarbonyl-bis-4 phenylpyridine ($10^{-3}$ moles). Deaerating was continuous and the solution was irradiated as in example 1 for 6 hours, resulting in the formation of quadricyclane.

COMPARATIVE EXAMPLE

The photocatalyst cuprous chloride was prepared according to the following procedure.

To a stirring solution of 10 g (0.06 moles) CuCl$_2$—2H$_2$O (cupric chloride dihydrate) in 10 ml water was slowly added a solution of 7.6 g anhydrous sodium sulfite in a minimum of water. Initially, the solution turned a dark brown, and, subsequently, the white copper (I) chloride began to precipitate. The precipitate and supernatant liquid were poured into a graduated cylinder which contained 1 liter of water to which has been added 1 g of sodium sulfite and about 2 ml of concentrated hydrochloric acid. The fine white precipitate settled to the bottom and the supernatant liquid was carefully decanted.

The solid was filtered on a fritted glass suction funnel in such a way that the supernatant liquid always remained above the surface of the solid. The precipitate was washed with several portions of glacial acetic acid, followed by several washings with absolute ethanol, followed by several washings with petroleum ether. The white solid was dried for about one minute with vacuum and then transferred to a dark bottle. The overall redox reaction utilized by this synthesis is as follows:

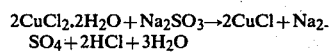

$2CuCl_2.2H_2O + Na_2SO_3 \rightarrow 2CuCl + Na_2SO_4 + 2HCl + 3H_2O$

A 1 molar ethanolic solution of 2,5-norbornadiene was prepared in 100 ml ethanol using 9.2 g (0.1 mole) of 2,5-norbornadiene. The solution was continuously degassed with nitrogen and to it was added 0.2 g ($2 \times 10^{-3}$ moles) of Cu(I)Cl. The solution was irradiated for 6 hours using the unfiltered light from the super-high pressure mercury arc lamp with continuous bubbling of nitrogen through the solution. Even with this precaution, the catalyst became deactivated due to the oxidation of copper (I) to copper (II). This oxidation was characterized by a color change in solution from near colorless to a greenish yellow. Copper (II) chloride was inactive as a catalyst for 2,5-norbornadiene/quadricyclane photoconversion.

The photocatalysts of the present invention, particularly the rhenium (I) photocatalysts, unexpectedly catalyze the isomerization of photoisomerizable compounds having activation energies greater than the triplet energy of the photocatalyst. The catalysts are thermally and oxidatively stable. The process of the present invention permits the capture and storage of light energy in the high energy conformation of the isomerizable compounds, for later release as heat upon reverse isomerization induced either thermally or catalytically.

Thus it should be apparent to those skilled in the art that the subject invention accomplishes the objects set forth above. It is to be understood that the subject invention is not to be limited by the examples set forth herein. These have been provided merely to demonstrate operability, and the selection of photocatalysts, isomerizable compounds, solvents, if any, and reaction conditions can be determined from the total specification disclosure provided, without departing from the spirit of the invention herein disclosed and described, the scope of the invention including modifications and variations that fall within the scope of the attached claims.

We claim:

1. A process for the capture and storage of radiant energy comprising exposing an oxidatively stable photocatalyst to said radiant energy in the presence of a reversibly isomerizable carbon containing compound, wherein said photocatalyst comprises a carbonyl compound of a metal selected from Re, Ir, Rh, Ru, Os, Pt and Pd and wherein said isomerizable compound is capable of forming an intramolecular strained carbon containing ring structure.

2. A process as in claim 1, wherein said photocatalyst is contacted with said isomerizable compound in the presence of a solvent.

3. A process as in claim 1, wherein said isomerizable compound has an activation energy of at least 62 kilocalories per mole.

4. A process as in claim 1, wherein said photocatalyst contains an organic ligand capable of accepting a redistribution of electron density from said metal upon absorbance of radiant energy.

5. A process as in claim 1, wherein said photocatalyst includes a salt of said metal.

6. A process as in claim 1, wherein said photocatalyst has the formula $$X_2 Me(CO)_3 L_b$$

wherein

Me is selected from Re, Ir, Rh, Ru, Os, Pt, Pd and mixtures thereof,

X is selected from Cl, Br, I and mixtures thereof,

L is selected from substituted and unsubstituted olefins, substituted and unsubstituted aromatics, and substituted and unsubstituted aromatic heterocyclic compounds having at least one of oxygen or nitrogen in the heterocyclic ring, and mixtures thereof; and wherein a=1 to 2 and b=0.5 to 10.

7. A process as in claim 1, wherein said radiant energy is solar radiation.

8. A process as in claim 1, wherein said isomerizable compound comprises bicyclo (2.2.1) hepta-2,5-diene.

9. A process as in claim 1, wherein said isomerizable compound is selected from carboxylic acid and ester substituted norbornadienes.

10. A process as in claim 1, wherein said photocatalyst comprises $ClRe(CO)_3(4\text{-phenylpyridine})_2$.

* * * * *